Dec. 20, 1955 O. K. KELLEY 2,727,360
MULTIPLE ROTOR CONVERTER HAVING PLURAL IMPELLERS
Original Filed Nov. 29, 1944 4 Sheets-Sheet 1
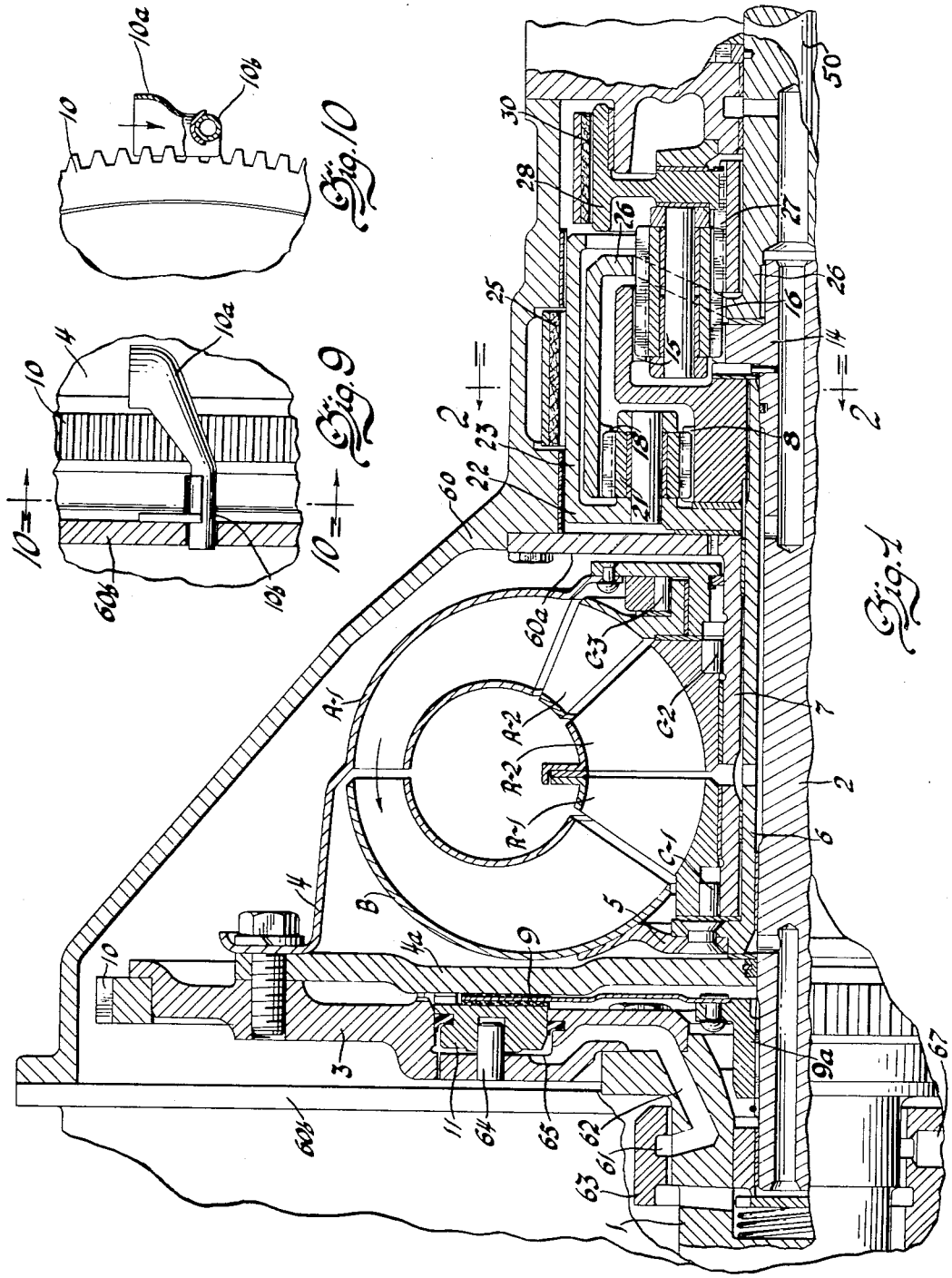
INVENTOR
*OLIVER K. KELLEY*
BY *Blackmore, Spencer + Flint*
ATTORNEYS Dec. 20, 1955          O. K. KELLEY          2,727,360
MULTIPLE ROTOR CONVERTER HAVING PLURAL IMPELLERS
Original Filed Nov. 29, 1944          4 Sheets-Sheet 2
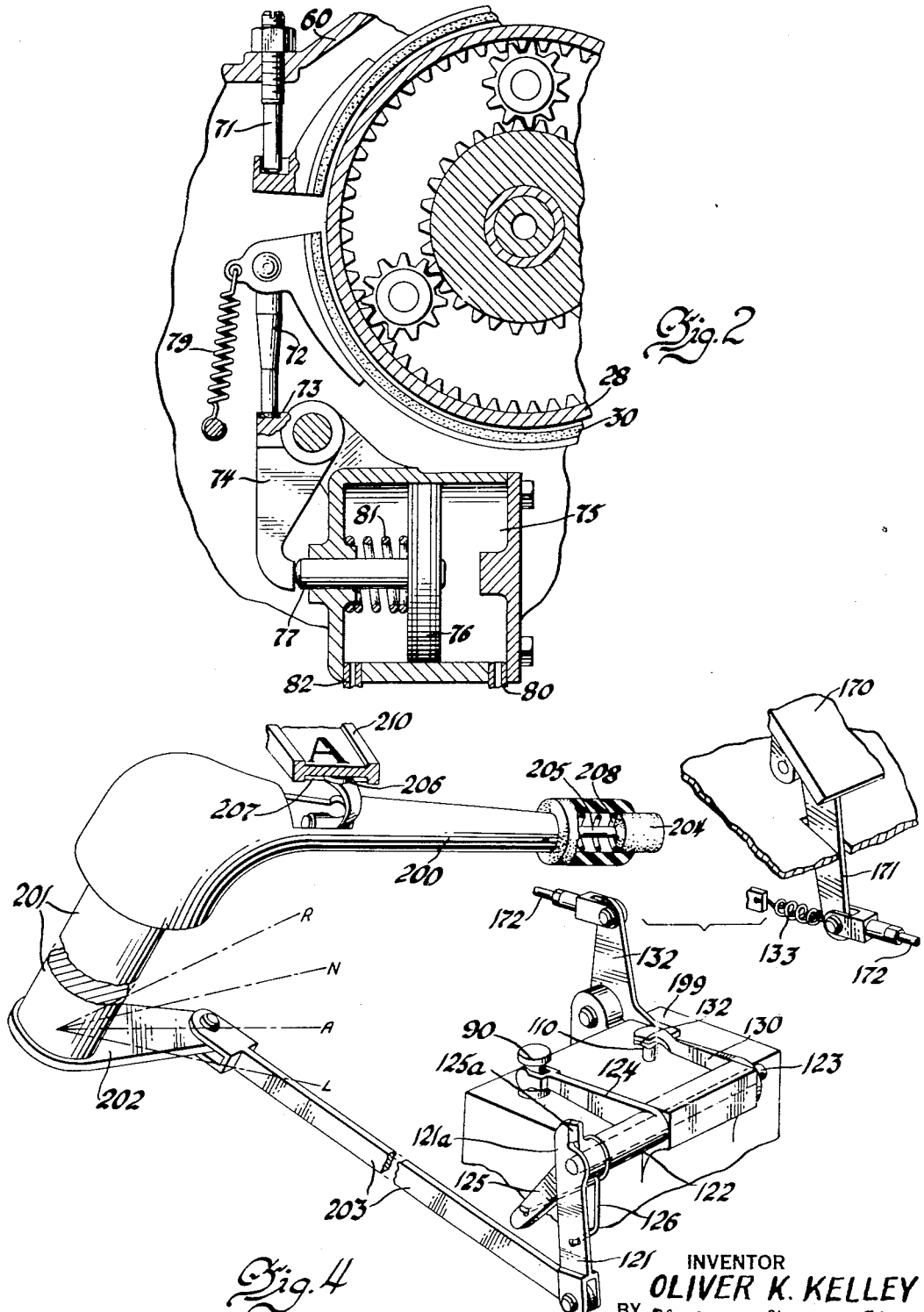
INVENTOR
OLIVER K. KELLEY
BY Blackmore, Spencer + Flint
ATTORNEYS Dec. 20, 1955     O. K. KELLEY     2,727,360
MULTIPLE ROTOR CONVERTER HAVING PLURAL IMPELLERS
Original Filed Nov. 29, 1944     4 Sheets-Sheet 3
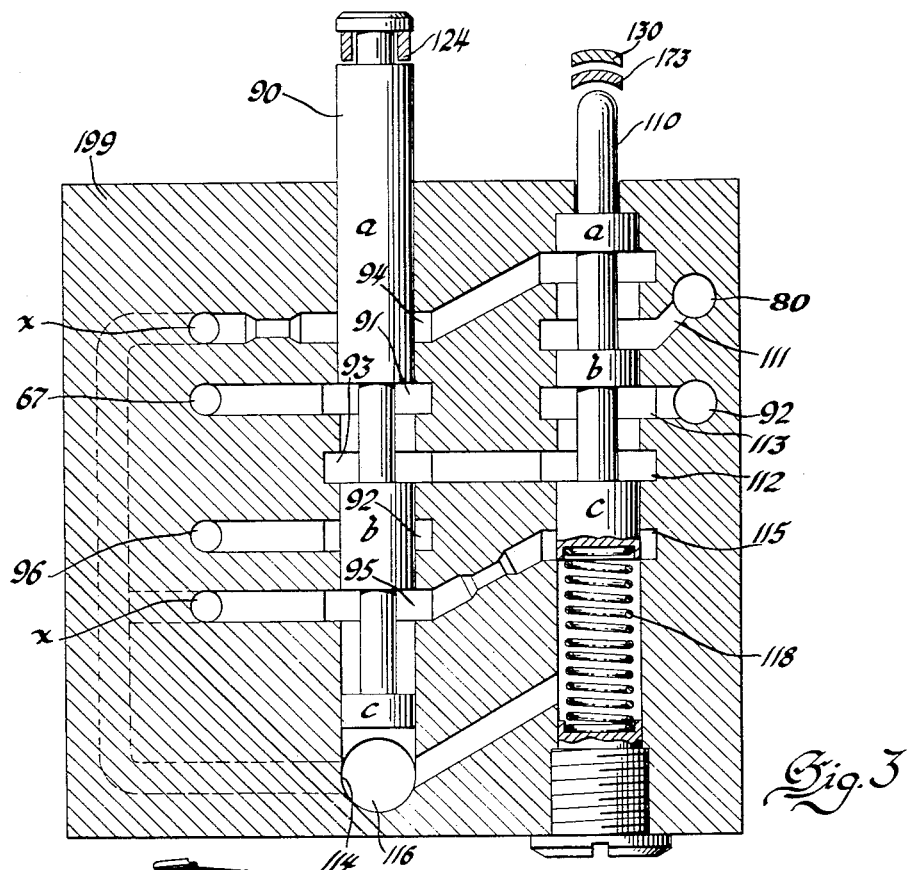
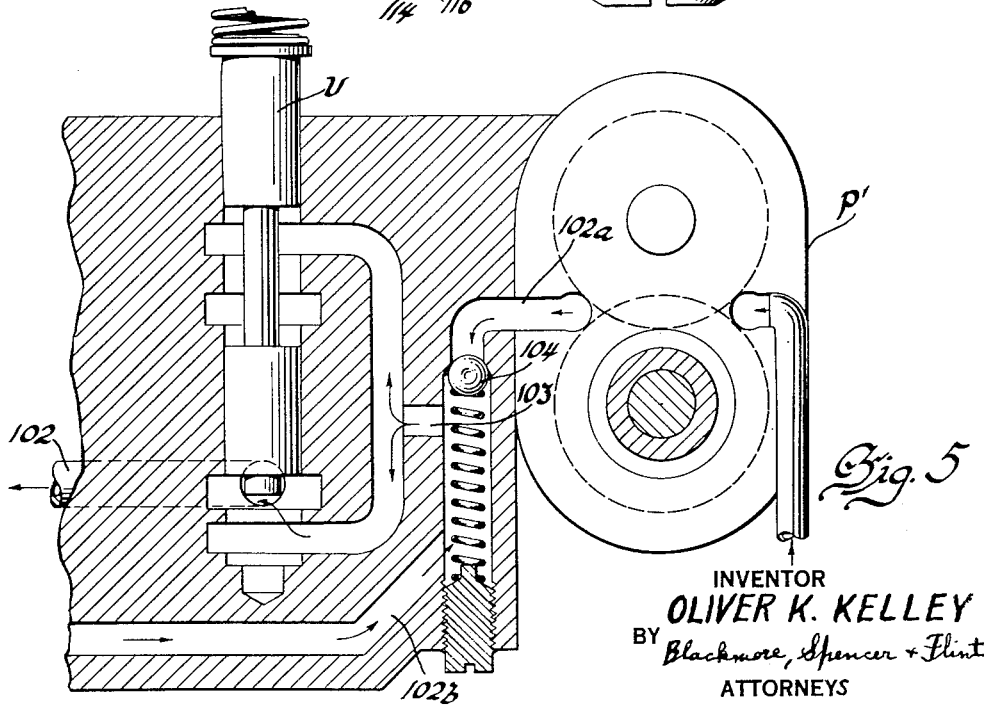
INVENTOR
*OLIVER K. KELLEY*
BY *Blackmore, Spencer + Flint*
ATTORNEYS

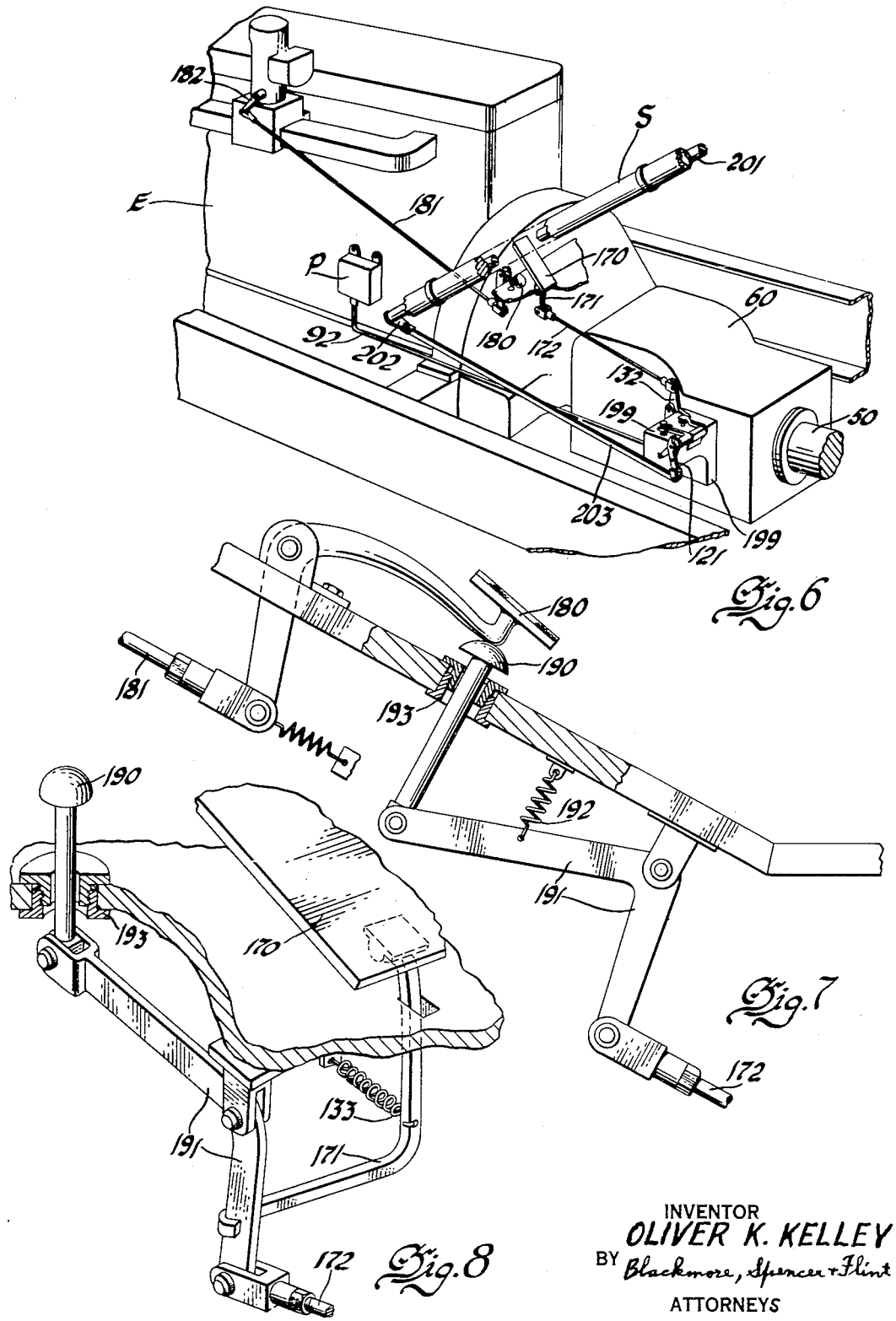

United States Patent Office 2,727,360
Patented Dec. 20, 1955

2,727,360

MULTIPLE ROTOR CONVERTER HAVING PLURAL IMPELLERS

Oliver K. Kelley, Birmingham, Mich., assignor to General Motors Corporation, Detroit, Mich., a corporation of Delaware Continuation of application Serial No. 698,018, September 19, 1946, which is a division of application Serial No. 565,592, November 29, 1944, now Patent No. 2,606,460, dated August 12, 1952. This application November 23, 1951, Serial No. 257,679

3 Claims. (Cl. 60—54)

This application is a division of my Patent 2,606,460, issued August 12, 1952 on application S. N. 565,592, filed November 29, 1944, the present application being a continuation of S. N. 698,018, filed September 19, 1946 (now abandoned) which was a division of said application S. N. 565,592.

The invention relates to driving gear and more particularly to fluid torque converters combined with positive gear drive. The present application is directed to combinations involving the torque converter arrangement of multiple rotors for obtaining a high efficiency range of speed ratios.

It is a principal object of the invention to provide a fluid, torque-multiplying unit connected with gearing and so arranged that a wide variable speed and torque range will be available, inherently automatic in accordance with speed and torque, by virtue of special arrangement of multiple vaned rotors and automatic clutch devices.

A particular advantage derives from the multiple rotors arranged in sequence of flow of the fluid in the working space included by them, so that their relative rotations are controlled by one-way clutches which permit certain of the rotors to rotate differentially under operating conditions which would otherwise create high impact losses.

An object is the provision of multiple rotors in a fluid torque converter referred to above as a fluid unit, so that a useful reduction of normal fluid losses is had, due to the arrangement of auxiliary vane wheels in a particular flow sequence of the torque-transmitting fluid, an auxiliary impeller being equipped with a one-way clutch for individual release from connection with its primary impeller for free running under certain driving conditions. An added object is to utilize multiple reaction wheels, individually coupled to the casing of the drive mechanism by one-way brakes so that each may establish reaction or run free at different speed points.

A particular object is to provide an assembly of rotors so related with respect to the radial inflow and outflow zones of a fluid torque converter working space, that the above-noted auxiliary impeller element is capable of delivering the fluid flow derived from the reaction rotors at an inner radial point of transfer to the inlet of the main impeller at point of transfer radially outward of the inner radial transfer point, for avoidance of impact losses during high torque drive intervals.

The described drive device has the advantage of enabling the designer to compress a large torque-handling capacity into a small volumetric space, thus creating a great saving in vehicles where space considerations for freight and passengers are extremely important.

By transmitting torque under more efficient relative speed-permitting conditions, in which impact losses are avoided, the torque converter unit here disclosed is capable of handling more torque per unit volume with less heat loss than other known devices in this field.

The foregoing objects will be found to have been accomplished in the device below described, and additional objects and advantages are likewise further stated in this description.

In addition to the foregoing stated advantages of the device of the invention, the following specification provides a description of further advantages set forth so that one skilled in the art may appreciate, understand and use the same.

Figure 1 is a side elevation in part section of the driving mechanism of the invention.

Figure 2 is a section in part, taken at line 2—2 of Figure 1, to show the operation of one of the brake actuators.

Figure 3 is a section taken through the valve body of the controls of the invention to show the relationships of the valving for the essential control operations.

Figure 4 is a composite view in part section projection of the manually operated controls extending from the driver's station to the valve body, conveniently mounted on the casing of the drive mechanism.

Figure 5 is a schematic view of a pump providing fluid servo pressure for the controlled actuation of the drive of the invention.

Figure 6 is a schematic projection view of the invention as installed in a vehicle with the hand lever control shaft shown attached to the vehicle steering column.

Figure 7 shows a modification of the control arrangements of Figures 4 and 6, in which the engine accelerator pedal at full stroke position, or beyond full throttle setting is arranged to compel the downshift of the drive mechanism to its lowest forward driving ratio. This may be used with the hand lever control of Figure 4, without an auxiliary pedal, or an arrangement such as shown in Figure 8 which includes both the auxiliary shift pedal and the accelerator pedal connection, Fig. 8 being a schematic view of the modification controls.

Figure 9 is a longitudinal, part-sectional view of a simple fluid feeding arrangement built into the casing for draining excess oil from the compartment of the fluid torque converter, and Fig. 10 is a transverse view of the arrangement of Fig. 9, being taken at line 10—10 of Fig. 9.

The input impeller A–1 of Fig. 1 is driven by overhanging drum 4 attached to the flywheel of variable speed engine shaft 1. The output rotor B is mounted on hub 5 rotating with hollow shaft 6 and with sun gear 8 of the reverse gear planetary group, and with annulus gear 15 of the forward drive gear group.

The reaction wheels R–1 and R–2 are arranged so that wheel R–1 is prevented from rotating reversely by roller clutch C–1, and wheel R–2 is prevented from backward rotation by roller clutch C–2, sleeve 7 being integral with or keyed to web 60a of casing 60.

The transmission shaft 2 is splined to hub 9a of clutch plate 9, gripped between the adjacent web 4a of flywheel 3 and presser plate 11, operable by fluid pressure and controlled by handlever, pedal or equivalent means. The shaft 2 carries at its rearward end sun gear 14 meshing with planet gears 16 externally as annulus 15 does internally.

Annulus gear 18 of the reverse drive unit meshes with planet gears 21 supported on carrier 22 having drum 23 upon which reverse brake band 25 may bear to stop rotation of carrier 22. Gear 18 is attached to output carrier 26 for the forward driving group, the planet gears 16 meshing with annulus 15, sun gear 14, and sun gear 27 attached to drum 28, brakable for forward reduction drive by band 30.

The impeller A–1 has roller clutch C–3 operative between A–1 and a sleeve portion of impeller A–2, arranged so that the impeller A–2 may rotate forward faster than A–1 but not lag behind it. This feature permits it to exceed the speed of impeller A–1 whenever the fluid velocity in A–2 is greater.

The brake 30 need only be occasionally used for normal driving, however with the engine running slowly or idling, the rotation of the impellers may not be sufficiently high for torque to be transmitted to rotor B, whether or not brake 30 be applied, and although clutch 9–11 be engaged.

Increased engine speed applies torque to rotor B, the direction of flow reaction causing reaction wheels R–1 and R–2 to endeavor to rotate reversely, but being held by one-way devices C–1 and C–2, the reaction wheels stand still, their blades imparting a torque multiplication component to the oil body being circulated by rotation of A–1 and of B.

When only clutch 9–11 is engaged, sun gear 14 has engine speed, and with output shaft 50 tending to stand still, the planet gears 16 are rotated reversely, tending to spin annulus 15, sun gear 8, sleeve 6 and rotor B backward.

As soon as an increment of torque is supplied by rotor B, annulus gear 15 tends to resist backward rotation and sets up a counteractive force, increasing with the rising capacity of the turbine unit, until the annulus gear 15 rotates substantially as fast as engine-connected sun gear 14, giving direct drive between shafts 1 and 50 except for a slight slip in the fluid unit. Gears 14 and 15 are mutually reactive.

If the engine speed is reduced, the sun gear 14 decelerates tending to drive the annulus 15 and rotor B forward faster, so that a coupling relationship obtains in the fluid unit, until the torque flows from the engine once more.

It should be noted that after the impeller A–1, A–2 and rotor B reach a given relative higher speed relationship above idling, the reaction rotors cease to receive a reaction component, and are coupled into the drive in the manner of the fluid flywheel. The reaction rotor R–2 is directly coupled by roller clutch C–2 to sleeve 7 and web 60a, and rotor R–1 is likewise coupled by clutch C–1 to the sleeve 7, so that the latter can exert an independent reaction torque effect whether or not C–2 locks R–2 against rotation.

The permitting of this differential rotation between the two adjacent reaction wheels R–1 and R–2 serves to reduce interstage shock losses, which result likewise obtains by the relationship of impeller A–2 to A–1, established by the freewheel clutches.

When extraordinary demand, as for hill climbing occurs, the brake 30 stops sun gear 27 forcing planet gears 16 to roll around it. For this drive, clutch 9–11 is disengaged, and the low gear drive is obtained from the fluid unit operating at an efficient reduction torque-speed ratio, and driving the gears, which provide further reduction.

Clutch 9–11 must be disengaged when brake 30 is fully applied, otherwise a locking couple would be set up in the gearing 14–16–27, since 27 would otherwise lock to sun gear 14.

The fluid unit causes sun gear 8 and annulus gear 15 to rotate at some reduction ratio of engine speed. Rotation of gear 15, merely spins the sun gear 14, shaft 2 and the free clutch plate 9 backward. However, with the vehicle load on carrier 26, planet gears 16 are required to spin forwardly, and with gear 27 stopped, the gears 16 rotate forwardly on their own centers, and also orbitally, requiring carrier 26 to rotate forwardly at a reduction ratio, proportional to the differential diameters of annulus 15 and sun gear 27. This permits the fluid unit to operate in its designed torque-speed ratio for highest efficiency, the heat losses being negligible. The low speed ratio of the gears is so taken with respect to vehicle load and engine power, that these conditions are satisfied, for all heavy gradient or traction work.

The transition between low and normal drive is quickly obtained by release of brake 30 and the coupling of clutch 9—11. For most practical purposes, brake 30 will be seldom used. It will be understood further that mutual interaction in the gear unit 14—15—16—27, with respect to the transfer of torque support between clutch 9—11 and brake 30, makes possible a maintaining of continuous torque during this interval, described in detail further.

It should be clearly understood that there is no forward drive until clutch 9—11 or brake 30 are engaged. The auxiliary forward drive is obtained by locking brake 30 to drum 28. If the torque capacity of the fluid unit is not sufficient to give a useful driving torque component to annular gear 15, application of the brake 30 will cause planet gear 16 to roll around the now fixed sun gear 27 so that with the engine speed applied to impeller A–1, carrier 26 rotates forwardly at low speed, there being two reduction ratios, that of the torque converter and that of the gear group 15—16—27, one superimposed on the other. This series drive is distinct from the parallel drive in which mutually reactive torque components are applied to carrier 26 and to output shaft 50 by annulus 15 from rotor B and by sun gear 14 by clutch 9—11.

The fluid torque converter or fluid unit of Fig. 1, upon circulation of liquid by impeller A–1, projects the liquid inward radially through output rotor B, giving up kinetic energy thereto as radius diminishes. The angular placement of the vanes of the reaction rotors R–1 and R–2 is such that they initially receive a backward component, locking the one-way devices C–1 and C–2, while redirecting the liquid to impinge on the vanes of the auxiliary or secondary impeller A–2 and the primary impeller A–1.

The otherwise abrupt speed differential between the liquid issuing from the stopped reaction wheels and impellers running at engine speed is ameliorated by the action of freewheel clutch C–3, which may let A–2 ahead faster than A–1. Since the entrance of A–1 is at a longer mean radius than A–2, its absolute velocity is higher and it is therefore better suited to receive the liquid issuing from the stopped reaction member when the rotational speed of the body of liquid exceeds the rotational speed of the input members.

For example, at near stalling speed, there is a high slip ratio from A–1 to B, and the velocity component of the fluid emerging from R–2 exceeds the absolute speed of A–2 and causes A–2 to spin ahead of A–1. At speeds upward of 1600 R. P. M., or around 40 miles per hour, the rotor A–2 may by design, be made to cause one-way clutch C–3 to lock, so that A–1 and A–2 both transmit impeller fluid force.

It may be stated that the input portion of the primary impeller A–1 is equipped with a nose wheel A–2 which can spin forward out of the way whenever the velocity component of the fluid from the reaction elements exceeds the desired inlet velocity of the primary impeller. This is believed a novel and important feature.

The circulation of fluid in the fluid unit of Fig. 1 is counterclockwise as indicated by the arrow, passing from primary impeller to output rotor, through the two reaction wheels, the secondary impeller, and returning to the primary impeller.

The differential velocities from wheel to wheel in a common circuit like this one are normally proportional to torque transmitted.

In accordance with design of blading, the conditions under which the reaction wheels R–1 and R–2 no longer receive reaction components, and are swept into forward rotation along with the other vaned members, are determined by vehicle speed and load torque and by engine speed and torque.

For example, at full throttle and at 1800 R. P. M., R–1 may freewheel forwardly, and at 3000 R. P. M., R–2 may freewheel forwardly, these relative speed points diminishing for part throttle settings. Being swept into forward rotation, they are free to run at some ratio below the speed of A–1 and B, the low differentials reducing the wheel-to-wheel shock losses otherwise present, and setting up a fluid circulation condition in which relative speeds of A–1 and B approach unity or 1-to-1 ratio, impressed upon annulus 15 and sun gear 14 to drive carrier 26 at approximately engine speed.

It should be understood that a variation of torque with speed occurs in the present internal combustion engine, and that when a fluid torque converter of the type described herein is constantly connected to a load applying mechanism, the torque converter torque capacity varies automatically with changes in the applied torques and speeds. This combination is therefore inherently adaptable to treatment in which the torque or horsepower curves of the engines are matched or equilibrated to the torque converter characteristics, enabling a differential speed or torque range of the torque converter to be chosen which provides a relatively high overall efficiency. This makes a possible a self-adjustment of converter speed ratio inverse to variation in load torque, while the engine throttle setting may remain fixed, there being automatic adjustment of converter speed ratio with increased load torque, while the torque converter capacity value remains within the useful or efficient zone.

In changing down from parallel drive to series drive, the absence of torque shock in the gear unit is due to the transfer of torque from clutch 9—11 to brake 30 wherein no torque differential is applied to sun gear 30, consequently the converter in assuming all of the driving torque which was once split through clutch 9—11, may then rise to a speed ratio at which there is equilibrium between torque developed and torque demand from the load.

The fluid pressure for actuation of the clutch 9—11 is supplied from pump P' of Figure 5 through valve 90 of Figure 3, being delivered through line 67 to gland 63, and passages 61 and 62 to cylinder space 65. The presser plate 11 is an annular ring piston guided on pins 64 supported in the flywheel 3, and is returned to inactive position by clutch disengagement springs, shown at 12. The web 4a of the flywheel is shaped to form a seat between which and the ring 11, the clutch plate 9 is clamped by the fluid pressure action. Centrifugal force on the fluid to the left of web 4a tends to vent fluid out of the driven disc space.

In Figure 2, a brake band actuating mechanism is shown in section, as devised for the actuation of bands 25 and 30 of Figure 1, by individual servo cylinders and pistons. Pipe 80 receives pressure from the output port of valve 110 of Figure 3.

In Figure 2, the brake band 30 for drum 28 is anchored by locating stud 71 in a portion of the casing 60; and the movable end of the band is pivoted to thrust rod 72 seated in notch 73 of lever 74 also pivoted on the casing. The pressure from pipe 80 enters cylinder 75, moving piston 76 to the left, its rod 77 projecting to actuate the long arm of lever 74. When the pressure is released, the spring 79 disengages band 30 from the drum, and the spring 81 returns the piston 76 to the right. Pipe 82 leads from the left end of cylinder 75 to the sump to provide a cushioning effect upon release of pressure in pipe 80, this closed system preventing oil contamination by the atmosphere.

The reverse band 25 is likewise operated by a similar fluid pressure servo actuator, and it is not deemed necessary to show the duplicate fluid pressure servo means.

The valve 90 of Figure 3 selects operation of reverse brake band 25 or of clutch 9—11; the valve 110 selecting operation of brake band 30 when in the "up" position, and admitting pump line fluid pressure to valve 90 in "down" position.

The valve 110 of Figure 3 is seated in a bore of valve body 199 and has three bosses a, b, and c, its upper end protruding a sufficient distance so that a full stroke of arm 124 downward, will cut off the pump pressure from the connection by the ports 93 and 112, and while exhausting same at port 115 will deliver pressure from port 113 to port 111 open to brake cylinder line 80. Valve 90 is seated in a similar bore with three bosses a, b and c.

Spring 118 retained by a screw plug, presses the valve 110 upward and is deflected by downward motion of arm 130 as shown in Fig. 3. The normal operating condition is for valve 110 to remain in the up position for both Automatic Forward drive and Reverse drive, being depressed for low drive when hand lever 200 is moved down and to the right as shown in Figure 4.

Valve 90 occupies three positions but cannot apply operative pressure for either Automatic-Forward or Reverse, unless valve 110 is in the normal "up" position.

For all practical purposes, valve 110 will be seldom used, therefore the control pattern places the auxiliary Low position at the end of the range of handlever movement upon normal Automatic running. The operator may be holding button 204 of Figure 4 freely depressed against spring 208, move the roller 206 entirely free of any cam track guides of stops and the vehicle may be rocked by skipping quickly through Neutral and Automatic between Reverse and Low, or by following the instructions given herein further.

Valve 90 has two delivery ports, 91 and 92 fed selectively from port 93 connected to port 112 of valve 110. Ports 94 and 95 lead to exhaust. In the mid-position boss b of valve 90, exhausts the pressure to prevent either the clutch 9—11 or the brake band 25 from being actuated.

Valve 110 of Figure 3 has two delivery ports 111 and 112, its inlet feed port 113 being connected to the pump line 102 of Figure 5. Port 114 is connected to exhaust at 94 and port 115 to exhaust 95. The pump line pressure in port 113 is delivered either to port 93 of valve 90 or to port 111 open to line 80 for actuating brake 30 of Figure 2. All exhaust ports connect to pressure relief outlet 116 draining the space under the valves to the sump indicated in Figure 5.

The flywheel starter ring 10 throws oil from the interior of casing 60 adjacent the flywheel, into a scoop 10a and passage 10b leading to the engine crankcase as indicated in Figs. 9 and 10. This expedient reduces fluid friction drag loss, and since the engine and transmission oil may be commonly used herein, a simple strainer arrangement in this closed system prevents clogging.

The pump P' of Figure 5 draws fluid from the sump and delivers it through a pressure regulating valve V, to line 102, providing a steady line pressure in port 113 of valve 110 of Figure 3.

The method for obtaining regulated line pressure is described in Letters Patent to Earl A. Thompson, U. S. 2,193,304, issued March 12, 1940, in connection with Figures 19 to 22 thereof. Pump P' is driven directly from shaft 50 as indicated in Figure 1, and a similar pump P is driven directly from the engine. P may be the engine lubricating pump. In order to have available sufficient pressure for all operating conditions it is necessary to combine the pressure from two pumps, one driven by the engine, and the other by the output shaft, therefore non-return valve 104 seats to prevent pump P' from draining the passages connected to line 102, when shaft 50 is driven in reverse. It should be understood that clutch 9—11 or band 30 are to be actuated when the vehicle is standing still for the purpose of obtaining initial drive, therefore the pressure system should provide actuator pressure as soon as the engine is running, as well as for a towing start of a stalled engine, when coupling clutch 9—11 is required.

Figure 4 shows a typical valve controller for the device of the invention wherein the projection view is sectioned in part to provide a clear understanding of the cooperation. Handlever 200 is attached to a control sleeve 201 carried on the vehicle structure for rotational movement of sleeve and lever.

Arm 202 of sleeve 201 is clevised to rod 203 connected to valve control arm 121 of Figure 4. Reciprocation of handlever 200 from its uppermost position down and to the right changes the valve settings from low to automatic to neutral and reverse, in that order. The button 204 slides in a cylindrical seat and is attached to rod 205 which carries a vertically projecting pin for roller 206 which intersects a cam track 207 in the under face of sector plate 210, shown in part section. The cam track 207 is contoured to guide and to stop the roller 206 in the various shift positions noted. The form of the cam track 207 may be taken to suit the operating conditions, so that for example, the button 204 need not be fully depressed against spring 208 for the normal forward to reverse shift, the roller 206 ratcheting between the stop positions; but for shifting to low, the roller may be moved over a blocking portion of the cam track 207, so that it may be latched fully for continued drive in low, without the driver holding the lever 201 against the spring force of the valve mechanism.

Lever 121 is moved rotationally by rod 203 from the motion of handlever 200. The lever 121 is fixed to shaft 123 mounted in a boss of the valve body 199, the other end of the shaft having affixed lever 130. The sleeve 122 is mounted to rotate about shaft 123, and has fixed to it lever 125 and valve operating arm 124. Hairpin spring 126 is curled around the sleeve with its ends secured in holes in the levers 121 and 125. Above the shaft, lever 121 has stop 121a which abuts stop 125a of lever 125, the effect of the hairpin spring being to hold the lower arms of the levers apart with the stops in abutment. Normal movement of the handlever 200 therefore causes the levers 121 and 125 to move together during the selection of reverse, neutral or automatic, while lever 130 swings freely. Upon counter-clockwise rotation of lever 121 beyond "Automatic" position, the valve arm 124 abuts against the upper face of the valve body 199 and is stopped; but because of the hairpin spring 126, lever 121 may continue to rotate far enough counterclockwise to cause lever 130 to depress the upper end of valve 110, for the purpose of exhausting the pump pressure from either of the feed ports 94 and 95 of Figure 3, and to connect the pump feed port 113 with the port 111 for actuating brake 30. For this operation, handle 200 is pulled down to its extreme lowermost position.

For various special types of operation, it may be desirable to provide a separate emergency control for actuating the Low brake 30, regardless of the setting of the handlever 200. This may be accomplished in various ways, for example, by the use of a separate element such as a lever 132 pivoted to strike the protruding valve 110, and operated from a rod 172 and lever 171. The spring 133 of Figure 4, may be tensioned by depression of pedal 170. This provides an extra facility in maneuvering not obtainable with the preceding described control, since it may be desirable for example, with the vehicle stuck in mud, sand or snow, to leave the handlever 200 in Reverse or Automatic position while rocking the car forwardly and reversely through simple depression and release of pedal 170.

It should be noted that the operator's hand on handlever 200 feels the additional force of spring 118 resisting the downward movement of valve 110 as well as the force of hairpin spring 126, so that he is warned of the drive condition. These springs are of low force value, to permit a latching action of button 204 and roller 206 in conjunction with the button spring 208. Various other arrangements utilizing these principles are possible, and may be chosen to suit the vehicle driving needs.

It should be understood that for towing a vehicle to start the engine a pump such as indicated at P', in Figure 5, driven by output shaft 50, provides pressure not available when pump P is not driven by the engine. The pressures of the two pumps is fed into a common outlet chamber such as shown in Figure 5, where passage 102a from pump P enters the chamber, and passage 102b leading from pump P' enters same, the final outlet of the chamber leading to regulator valve V.

The initial pressure from pump P' operates the check valve 104 and feeds to the chamber.

Valve 104 prevents reverse rotation of pump P' from sucking oil out of the chamber.

In this way, the engine driven pump P' supplies pressure for starting, the output shaft pump for adding to pressure and for towing of the vehicle, thus supplying the valves 90 and 110 so that at no time when the engine or the vehicle are running will there be a lack of servo pressure, or lubrication pressure.

In order to assure a certain degree of overlap between operation of clutch 9—11 and brake 30, restriction ports in the exhaust passages leading out of port 94 and port 115 put a time dwell in the release of the clutch. The building up of pressure in cylinder 75 of brake 30 may occur quickly since the pumps P and P' maintaining line pressure, while the release action of the springs of clutch 9—11 must oppose the orifice effect of either of the restrictions shown.

A further factor is the snubbing action of the band 30 on drum 28. When the vehicle is proceeding in "split-torque" drive, that is, with clutch 9—11 engaged, the carrier 26 is at output speed, sun gear 14 is at engine speed and annulus gear 15 may be at engine speed or at a much lower speed, even rotating reversely. The idling sun gear 27 is controlled in part by the spinning of the planets 16. If 14 and 15 are at the same speed, of course 27 has forward rotation. If 14 is standing still, the planets spin reversely and 27 is still idling forwardly. If 14 is rotating reversely, 27 is yet idling forwardly. The drum 28 under "split-torque" drive has a forward spin which brake 30 endeavors to stop. The arrow in Figure 2 shows this normal forward spin. The "hand of rotation" of band 30 with respect to the anchor 71 and the movable end is such that the band will self-lock when drum 28 has a negative or reverse reaction component. This cannot occur until the exact instant sun gear 14 is declutched and all torque is thereafter derived from annulus 15. Whatever timing lag there may exist because of inertias is taken care of by the permitted minute slip of the friction surfaces of the clutch or brake.

Since band 30 is already loaded by the pressure in cylinder 75 on piston 76, the arrival of the reverse reaction component on drum 28 is anticipated, and the band instantly self-locks at approximate zero speed without drive shock. This is a split-second interval.

It will be seen that on shifts from "split torque" to series reaction drive, the device is safeguarded from there being an appreciable no-torque interval, which otherwise would permit the power-connected parts to idle at high speeds, which is undesirable. This cooperation of clutch and brake controls has therefore two overspeed safeguards, and this is considered to be a useful feature, since it enables the operator under heavy going, to shift to auxiliary Low at once, without being concerned with torque reaction effects or with high idling over-speeding of the engine and connected parts. The absence of torque on either of the mutually reactive sun gear 14 or annulus gear 15 would otherwise permit the other member to run away.

Upon shift to engagement of clutch 9—11 with release of brake 30, valve 110 promptly drains brake cylinder 75 so that piston 76 is retracted, and clutch 9—11 is simultaneously fed from port 91 of valve 90 of Figure 3. However, a dwell of self-locked brake 30 occurs, during the interval when torque is still being transmitted by annulus gear 15, before the energisation of clutch 9—11 can relieve the drum 28 of its reaction locking component. This dwell is not terminated until clutch 9—11 begins to apply engine speed to gear 14, whence band 30 unlocks from drum 28.

The cooperation of the clutch and brake with the dual input element transmission gear unit is effective to prevent an appreciable no-torque interval, therefore, for both shifts of engagement of the clutch 9—11 and brake 30.

This novel arrangement protects the drive from damaging shocks and unpleasant gear and engine noises, and is believed unique in this presentation.

Figure 6 shows the placement of the invention in a vehicle, the handlever sleeve 200 being bracketed to a steering column for convenience of lever 200 to the driver's hand below the steering wheel. The floorboards are shown supporting the accelerator pedal 180 operating throttle rod 181 and throttle 182, and the shift pedal 170 with lever 171 and rod 172 pivoted to operate lever 132 pivoted on the valve body 199 for depressing valve 110 of Figure 3 to establish Low gear drive, and to release same when the pedal is retracted. The arm 202 and rod 203 operate valve lever 121 as shown in Figure 4. The pump P is shown as mounted on the engine E with feed pipe 92 leading to valve body 199, port 113 of Figure 3.

The modification of Figure 7 substitutes the button 190 and lever 191 for the separate pedal control of valve 110 of Figures 4 and 6. In Figure 7 the accelerator pedal 180 at a given advanced position strikes button 190, depressing it to rock bellcrank lever 191 against spring 192 and shift the rod 172, to depress valve 110 to Low brake position. The pedal striking point is regulated by the adjustment screw-and-nut 193 which acts as a stop for the lifting force of return spring 192. This enables the operator to obtain automatic downshift to low at a throttle pedal point preceding full throttle, at full throttle, or beyond same, as desired, while retaining the facility therefor afforded by the Figure 4 arrangement.

In Figure 8 the dual combination of accelerator pedal and auxiliary shift pedal for changing to Low is given in schematic projection. The lever 171 of pedal 170, instead of connecting directly to rod 172, is bent to intersect the motion of bellcrank 191 of Figure 7, so that the operator may shift to Low at low throttle opening, the juxtaposition of the pedals 170, 180 making it possible to hold the drive in Low while rocking the foot laterally to advance the engine speed. Springs 192, 133 serve to return the Low shift pedal operating mechanism to inactive position. This is for a drive in which the operator may be required to use his hands for steering and other purposes, such that manipulation of the handlever 200 would be difficult. In agricultural machinery, military vehicles and similar special purpose drives, controls of this character are required for easy maneuvering. In ordinary passenger car work the handlever and advanced accelerator pedal disclosures of Figures 4 and 7 are adequate, and the coordinating arrangement of Figure 8 is not necessary to comfortable operation.

*Operation*

The driving operation of the vehicle equipped with this drive is quite simple. The handlever 200 of Figure 4 is placed in Neutral and the starting of the engine pump P creates pressure in servo line 102 of Figures 3 and 5, where the boss b of valve 90 blocks the feed of servo pressure when valve 110 is in the "up" position, therefore there is no servo actuation of any brake or clutch. The engine may be raced or warmed up, and since the converter elements are unloaded, the connecting parts may idle freely.

Moving the handlever 200 to Automatic, lowers valve 90 to feed pressure to clutch cylinder 65 through line 67 and connecting passages. The clutch 9—11 engages sun gear 14 to rotate at engine speed, while the variation of the engine throttle such as indicated in Figure 6 varies the speed of impeller A-1, and consequently the torque component of rotor B, applies a variable torque to annulus gear 15, which added to that of sun gear 14 starts the drive of the vehicle from rest. Torque reaction has locked the rotors R-1 and R-2 against reverse rotation and a torque multiplying effect is created within the working space of the torque converter. The rise in impeller and rotor speeds serves to accelerate annulus gear 15 forward until it approaches the speed of sun gear 14. At some chosen torque and speed relationship the reaction rotor R-1 may begin to freewheel forwardly, and at some higher value the reaction rotor R-2 may likewise freewheel forwardly as described preceding. At some chosen point the auxiliary impeller A-2 is no longer idling at a higher speed than A-1, but is locked to rotate with the latter, both then transmitting impeller force. For general purposes the locking of A-2 to A-1 is preferred to occur at a speed and torque point lower than those at which the reaction rotors begin to freewheel forwardly.

It is seen that during the normal automatic operation, the driver merely changes the engine throttle setting to vary the torque of the engine, in accordance with the driver's desire for vehicle speed, and upon relaxing of the throttle, the rotors R-1, R-2 being free to find their proper forward speed, thereby permitting an efficient reverse circulation impelled by the turbine member B, which action provides a measurable amount of engine braking.

Under heavy going, the operator may shift the handle 202 into Low, which as described, cuts off the pump pressure from the clutch 9—11 and applies the servo line of pressure to the brake cylinder 75 of Figure 2 for actuating brake 30. This causes sun gear 27 to stop and establishes low gear drive through rotation of annulus gear 15 applying a reduction ratio to output carrier 26. During this regime, a double reduction of speed ratio occurs since the torque converter is now delivering all of the engine torque, at a reduction ratio.

Return to normal Automatic drive is achieved by merely shifting the handle 200 back to Automatic position, releasing brake 30 and applying clutch 9—11.

The auxiliary method of enforcing series drive at double reduction described in connection with Figures 6 and 7 simply requires the operator to leave the hand lever alone, and hold the pedal 170 in down position. This operation applies a thrust to rod 172 rocking lever 132 and arm 173, depressing the valve 110, enabling the operator to return quickly to the preceding drive condition by taking his foot off of pedal 170. The modification arrangement shown in Figure 7, eliminates the need for pedal 170 and applies the down shift operation to the accelerator pedal 180. At extreme accelerator position when the engine throttle is nearly or actually wide open, the Automatic downshift to auxiliary Low is thus obtained. A double pedal control which combines both the operations of Figures 6 and 7, is shown in Figure 8, and gives the operator optional selection of down shift to Low by either pedal movement without moving the hand lever, but this last modification would rarely be required since the hand lever 200 is convenient to the operator for all ordinary downshift requirements, without the added complications of the extra mechanisms.

It is deemed of unique value to be able to control downshift to Low by both the pedal and the handlever, and the accelerator pedal interlinkage providing this facility is believed to furnish adequate driver will control selecting between two automatic speed ratio ranges of a torque converter without the complication of governor devices in automatic shifts.

In shifting to Reverse the handlever 200 is moved upward towards the left in order to place the valve 90 in position to admit pressure to the line 96 for the servo cylinder, not shown, for brake 25. As described preceding, this operation may proceed by shift of the handlever from Neutral to Reverse position, or the handle may be left in the Reverse position while auxiliary shift pedal 170 is depressed for forward drive and released for return to Reverse drive. This latter facility is believed to be novel and useful especially for the maneuvering of heavy vehicles operating in muddy, sandy or snow-covered terrain.

The foregoing description of operation provides the fundamentals for the driving structure herein described, and outlines their advantages. It is thought useful to have a single connection between the valve body mechanism and the hand lever for all normal shift control operations. The emergency control for valve 110 may be linked by Bowden wire, fluid column and electrical circuit or any other equivalent force transmitter.

The preceding description encompasses a number of novel features among which are the arrangement of the drive elements for providing successive parallel and series torque multiplication and the cooperating clutch and brake controls which make that operation possible, while eliminating torque shock during the transfer period; as well as the extremely simple control mechanism described above in combination with the actuation means.

It is believed clear that a number of inter-related features of novelty embodying inventive combinations are disclosed herein. The invention provides a simple, useful, and effective means for obtaining a wide range of torque multiplications in a combined fluid and gear drive, controlled by fluid pressure, with valving arranged to pick out the shift functions required which positively eliminate undesired shift characteristics, inherently yielding a factor of safety against wrong motion. Changes may be made in the specific arrangements of structures embodying the teachings disclosed herein without departing from the spirit and scope of my invention, which is set forth in the appended claims.

I claim:

1. A hydraulic torque converter having bladed pump, turbine and reaction members arranged to form a closed fluid circuit working space in which the pump discharge and turbine inlet are adjacent the portion of said fluid circuit of largest radius and in which the reaction members are adjacent the portion of said fluid circuit of smallest radius, a non-rotating casing for said converter, overunning means connecting said reaction members and said casing so that said reaction members may turn only in the same direction as said pump and turbine members, said pump having a primary portion which extends from the portion of said fluid circuit of largest diameter radially inwardly at least a substantial part of the distance between said turbine member and said reaction members, said pump having a secondary portion which extends between said reaction members and said pump primary portion, said pump secondary portion being rotatably supported relative to said pump primary portion and being connected to said pump primary portion through an overrunning device so that said pump secondary portion is rotatable only in the forward direction relative to said pump primary portion, said pump secondary portion being located in a radially extending portion of said fluid circuit and being proportioned so that the inlet and outlet ends of the portion of the fluid circuit formed by said pump secondary portion are spaced apart radially a substantial distance, whereby the mean fluid flow through said secondary impeller portion has a greater radial than axial component.

2. A hydraulic torque converter having bladed pump, turbine and reaction members rotatable about a common axis within a containing casing and arranged to form a substantially closed fluid circuit having portions extending in a radial direction and having other portions extending in an axial direction, said pump, turbine and reaction members being arranged so that the pump discharge and turbine inlet are adjacent the portion of said fluid circuit of largest radius and so that said reaction member is adjacent the portion of said fluid circuit of smallest radius, a first overrunning device connected with said reaction member and said casing so that said reaction member may turn only in the same direction as said pump and turbine members, said pump having a primary portion which extends from the turbine inlet a major portion of the distance to the discharge from the reaction member and forms a substantial part of a selected one of the radially extending portions of said fluid circuit, said pump having a secondary portion which extends between said reaction member and said pump primary portion and forms at least a substantial part of said selected one of the radially extending portions of said fluid circuit, said pump secondary portion being proportioned so that the inlet and outlet ends of said portion are spaced apart radially a substantial distance whereby the mean fluid flow through said secondary impeller portion has a greater radial than axial component, said pump secondary portion being rotatably supported relative to said pump primary portion and being connected to said pump primary portion through a second overrunning device so that said pump secondary portion is rotatable only in the forward direction faster relative to said pump primary portion.

3. A hydraulic torque converter having bladed pump, turbine and reaction members rotatable about a common axis within an enclosing casing and arranged to form a substantially closed fluid circuit which circuit includes first and second radially extending portions the ends of which are connected by a first axially extending portion forming the radially outermost part of said fluid circuit and by a second axially extending portion forming the radially innermost part of said fluid circuit, said pump, turbine and reaction members being arranged so that said pump member forms at least a major part of said first radially extending portion of said fluid circuit and so that said turbine member forms at least a major part of said second radially extending portion of said fluid circuit and also so that said reaction member forms at least a major part of said second axially extending part of said fluid circuit, said reaction member being mounted on a stationary portion of said casing and being rotatable relative thereto in the forward direction only, said pump member comprising a primary and a secondary portion, said pump secondary portion being located radially inwardly of said pump primary portion and forming at least a substantial part of said first radially extending portion of said fluid circuit, said pump secondary portion being proportioned so that the inlet and outlet ends of said portion are spaced apart radially a substantial distance whereby the mean fluid flow through said secondary impeller portion has a greater radial than axial component, said pump secondary portion being rotatably supported relative to said pump primary portion and being connected thereto through an overrunning clutch arranged so that said pump secondary portion is rotatable in the forward direction only relative to said pump primary portion.

References Cited in the file of this patent

UNITED STATES PATENTS

| | | |
|---|---|---|
| 1,760,480 | Coats | May 27, 1930 |
| 1,855,967 | Jandasek | Apr. 26, 1932 |
| 1,965,518 | Wilson | July 3, 1934 |
| 2,196,585 | Gette | Apr. 9, 1940 |
| 2,222,618 | Jandasek | Nov. 26, 1940 |
| 2,271,919 | Jandasek | Feb. 3, 1942 |
| 2,687,616 | Kelley | Aug. 31, 1954 |